Aug. 6, 1968 J. H. BROOKS 3,395,680
CONSTANT-PEAK PRESSURE, ROTARY VALVE ENGINE AND
METHOD OF OPERATION THEREOF
Filed Dec. 14, 1966 2 Sheets-Sheet 1

INVENTOR
JOHN H. BROOKS
BY
ATTORNEYS

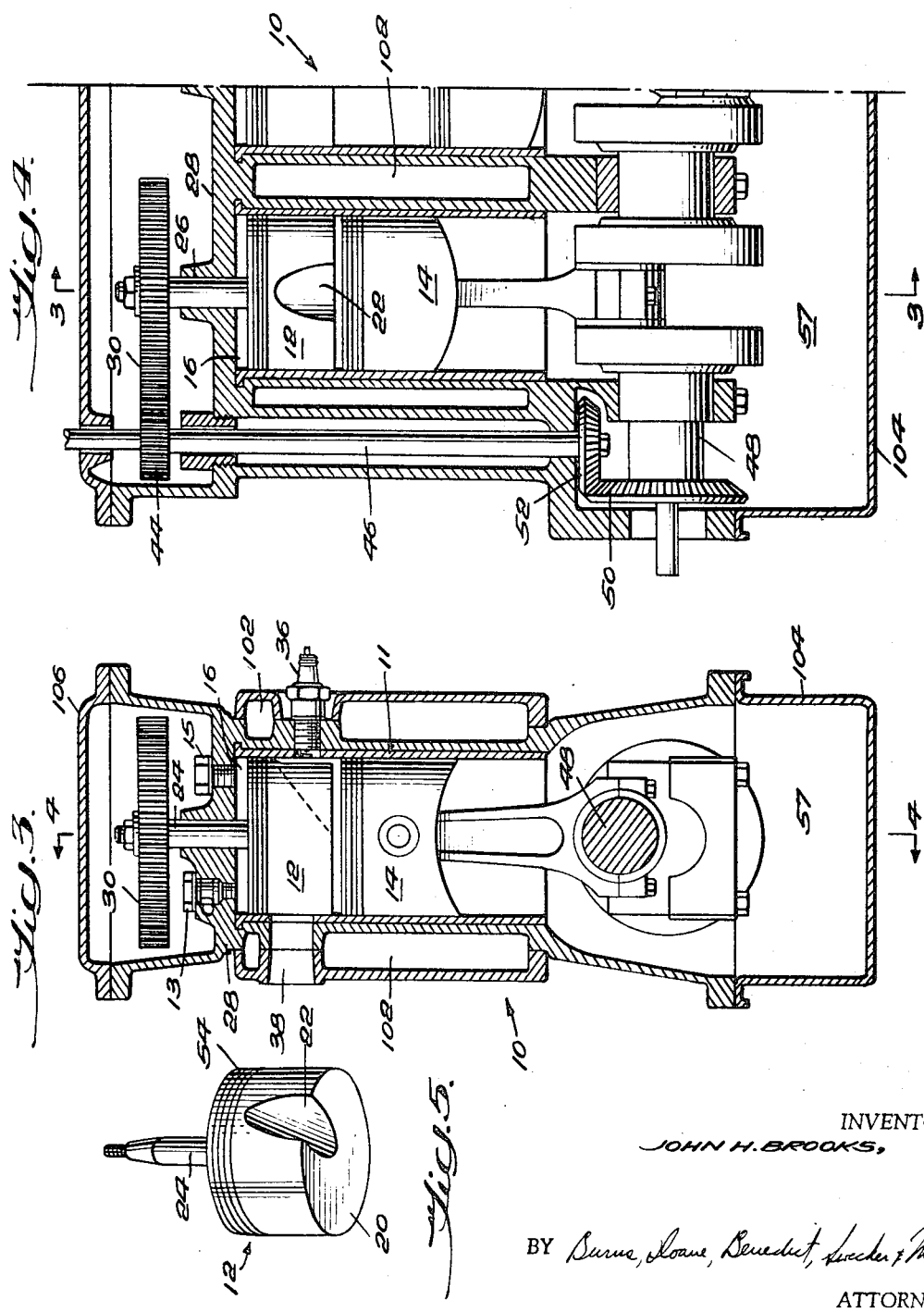

United States Patent Office 3,395,680
Patented Aug. 6, 1968

3,395,680
CONSTANT-PEAK PRESSURE, ROTARY
VALVE ENGINE AND METHOD OF
OPERATION THEREOF
John H. Brooks, Encino, Calif., assignor to McCulloch
Corporation, Los Angeles, Calif., a corporation of
Wisconsin
Filed Dec. 14, 1966, Ser. No. 601,581
12 Claims. (Cl. 123—78)

ABSTRACT OF THE DISCLOSURE

An internal combustion engine including a cylinder-head defining rotary valve member supported by an annular fluid body for movement toward and away from a reciprocating piston. The annular fluid body serves to vary the position of the cylinder-head valve so as to maintain a constant peak combustion pressure and concurrently serves as a fluid thrust bearing for the cylinder-head rotary valve mmeber.

General background of invention

This invention relates to rotary valve-operated internal combustion engines, and more particularly to a rotary valve-operated engine having a variable compression ratio.

Four-stroke cycle internal combustion engines which utilize a single rotary valve member positioned in the combustion end of a power cylinder to control the events of the cycle in place of conventional poppet valves have been proposed by others such as Aspin and Hall. These engines possess certain advantages over poppet valve-operated engines in addition to that of a single valve member taking the place of two valves, i.e. intake and exhaust, for accomplishing substantially the same purpose. Rotary valve-operated engines also breathe excellently and thus have improved volumetric efficiences because the flow paths for the gases are short, and the ports are large and obstruction free. These engines also have improved combustion efficiencies due to the centrifuging action of the fuel charge in the rotating combustion spaces formed in the rotary valves which produces richer mixtrues near the spark plugs. Additionally, since the rotary valves are usually driven through direct gear drives, they have almost no speed limit.

However, some problems are associated with rotary valve-operated engines such as gas leakage past the valve members, and difficulties in lubricating and cooling the valve members. These problems have been overcome to some extent by the provision of seat members or special inserts in the cylinders which have complementary gas sealing and bearing surfaces for the valves, and supplementary thrust bearings exteriorly of the cylinders. However, this structure adds significantly to the cost and the weight of the engine and sometimes presents other problems.

Variable compression ratio engines have long been recognized for their improved thermal efficiency and low fuel consumption over a wide range in engine load conditions, and particularly during part-load operation. They achieve these results by continuously varying the compression ratio during the operation of the engine by varying the clearance volume or combustion space to suit the particular load, i.e. high compression ratio for starting and light loads, and low compression ratio at high loads, so as to maintain a substantially constant optimum combustion pressure as the load changes.

One of the basic problems with early designs was the failure to provide a quick response for the movable element which varied the clearance space as the engine load changed. This problem has been overcome to a certain extent in some engines by hydraulically controlling an auxiliary piston in an auxiliary control cylinder in communication with the power cylinder. In others, a porton of the power piston is moved by fluid pressure to vary the compression ratio. However, these designs possess various disadvantages, notably high cost, and as a result not many are presently in production.

Objects of the invention

The principal object of this invention is to provide an internal combustion engine which combines the advantages of a constant-pressure, variable compression ratio engine with the advantages of a rotary valve-operated engine and which substantially overcomes or minimizes the disadvantages of each, heretofore encountered.

Another object of the present invention is to provide an improved internal combustion engine construction having a rotary valve which continuously and automatically varies the compression ratio to suit the load.

A further object of the subject invention is to provide a variable compression ratio engine which responds quickly to changes in operating conditions and utilizes a minimum of moving parts.

Still another object of this invention is to provide a rotary valve-operated, internal combustion engine with improved cooling, lubrication and bearing means for the valve member.

Yet another object of the invention is to provide a method of supporting and cooling an axially movable, rotary valve for an internal combustion engine.

In accordance with a preferred embodiment of the present invention, the above and other objects are attained by providing within a four-cycle engine an axially movable, rotary valve member positioned in the upper end of a power cylinder, wherein the height of the valve member is automatically controlled to vary the compression ratio of the engine so as to maintain a substantially constant-peak combustion pressure throughout the operating range of the engine.

The axial movement of the valve member is controlled by an inlet check valve and an outlet check valve which regulate the pressure and volume of oil in a balance reservoir formed between the top of the valve member and the cylinder head. The valves are set to open at predetermined pressure levels in proportion to the pressure in the combustion space above the power piston such that a substantially constant-peak combustion pressure is maintained regardless of the load. The oil may be engine oil supplied to the reservoir under pressure from the crankcase by the engine lubricating oil pump.

In order to limit the downward travel of the rotary valve member, a position-limiting spill slot may be provided to rapidly discharge oil from the reservoir.

The valve member may be cooled by a method of supplying oil under pressure from a cool region to the reservoir, and discharges oil from the reservoir which has become heated.

A fluid thrust bearing for the valve member may be provided by a method of varying the pressure and volume of the fluid in the reservoir as the axial loading of the valve varies.

Other objects and advantages of the invention will become readily apparent from a consideration of the following detailed description and the accompanying drawings in which:

Drawings

FIGURE 3 is an elevational view, partly in section, of the entire internal combustion engine of FIGURE 1, except for the accessories;

FIGURE 4 is an elevational view, partly in section, of the engine of FIGURE 3 taken along the lines 4—4; and FIGURE 5 is a perspective view of a preferred embodiment of the rotary valve member according to the invention.

Figure 1:
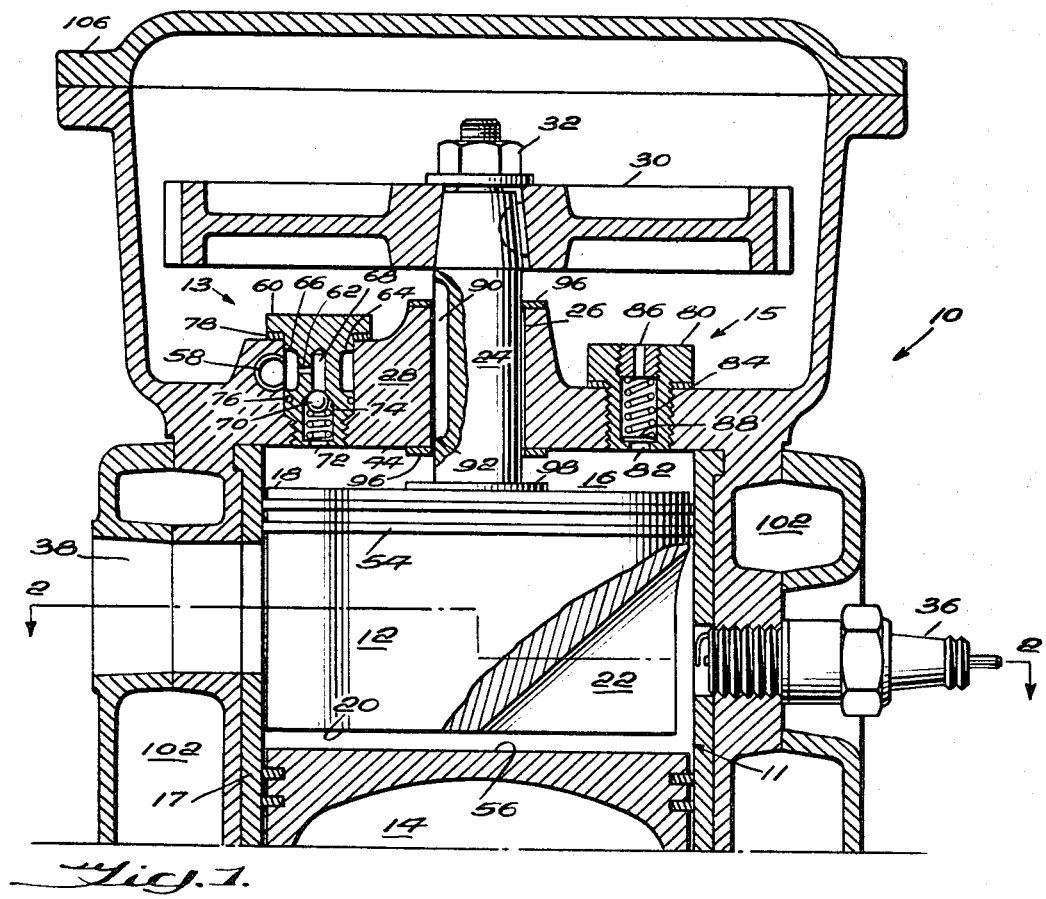
FIGURE 1 is an elevational view, partly in section, of the upper portion of a constant combustion pressure, rotary valve-operated, four-stroke cycle, internal combustion engine constructed in accordance with the present invention.
Figure 2:
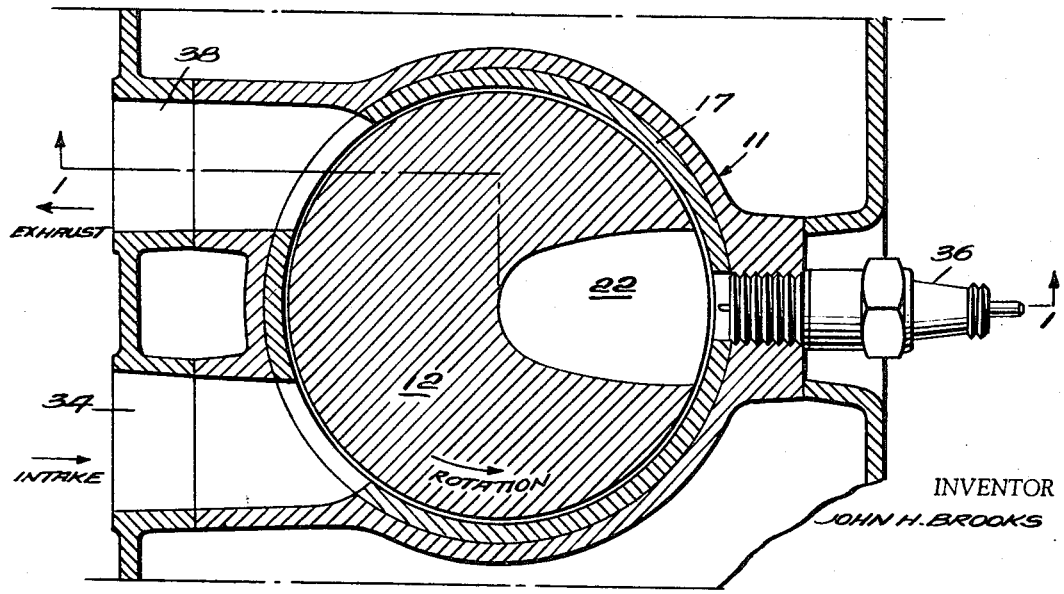
FIGURE 2 is a plan view in section taken along lines 2—2 of FIGURE 1.

Referring now to the drawings, there is shown in FIGURE 1, the upper part of a four-cycle engine 10 incorporating an axially movable, rotary valve member 12 positioned in the combustion end of a power cylinder 11 which varies the clearance space above a power piston 14 shown at the top of its stroke. Axial movement of the valve member 12 is automatically and continuously controlled by a spring-loaded inlet valve 13 and a spring-loaded outlet valve 15 which regulate the pressure and volume of oil in a reservoir 16 formed above the rotary valve member 12.

The rotary valve member 12 is located in the working or combustion end of the power cylinder of the engine 10 and comprises a cylindrical main body with top and bottom circular, flat faces 18 and 20, respectively. The body of the valve 12 has a hollowed-out portion 22 which extends generally diagonally from the cylindrical side surface of the body to the bottom face 20 and which forms a combustion chamber or space for the fuel/air mixture and also provides a flow passage for the gases into and out of the power cylinder.

The valve body 20 is supported at the lower end of a vertically extending shaft 24 and is connected thereto. The shaft 24 extends upwardly through a bore 26 formed through a cylinder head 28 and is slidably received therein. A spur gear 30 is keyed to the upper end of the shaft 24 and is held on the shaft by means of a suitable fastening means such as nut 32.

The events of the engine cycle are carried out by a timed rotational indexing of the valve member 12 such that the combustion space 22 is successively placed in fluid communication with an intake passage 34, a spark plug 36 and an exhaust passage 38. These passages are suitably formed in the block of engine 10 and are preferably positioned around the wall of the cylinder 11 and a cylinder liner 17 at about the same location longitudinally of the cylinder.

The gear 30, shaft 24 and valve member 12 are rotatably driven at one-half engine speed by a pinion gear 44 which may be mounted on the upper portion of a long vertically extending shaft 46. The shaft 46 may be driven by the engine crankshaft 48 through a pair of bevel gears 50 and 52 as shown in FIGURE 4.

The diameter of the body of valve 12 is slightly less than the inside diameter of the cylinder and/or liner 17, to enable the valve member 12 to move freely within the cylinder and to allow for heat expansion of the valve member. The upper part of the valve body is provided with sealing rings 54 to maintain an effective seal between the periphery of the valve body and the cylinder wall above the combustion chamber and the intake and exhaust ports.

The up and down axial movement of the rotary valve member 12 is produced by the variations in the fluid pressures acting on the top and bottom faces of the valve member 12. The amount and direction of this movement will be determined by a pressure differential that exists at a particular time between the pressure of the oil in the reservoir 16 compared with the pressure of the gases in the combustion space above the crown 56 of piston 14. Oil, which may be from the engine crankcase 57 is pumped under pressure by a suitable pump, such as the engine oil pump (not shown) through an oil line 58 which terminates in the cylinder head 28 adjacent the one-way inlet valve 13.

The inlet valve 13 comprises a body 60 having a transverse metering passage 62 of reduced diameter which provides fluid communication between an annular channel 64 formed by an annular groove 66, and a central axially extending passage 68. A spring-loaded, ball-check valve 70 is located in an enlarged portion of the central passage 68 and allows oil to enter the reservoir 16 through an inlet orifice 72 when the ball valve 70 is displaced from its seat 74. This happens when the pressure in the oil line 58 exceeds the pressure in the balance reservoir 16. Suitable sealing gaskets or the like 76 and 78 may be installed to prevent leakage of oil past the body 60 of the inlet valve.

The one-way outlet or spill valve 15 comprises a body 80 having an orifice 82, an enalrged central passage 84 and a coaxial passage 86 of reduced diameter. A spring loaded check member 88 is maintained on its seat 89 until the oil pressure in the reservoir 16 reaches a predetermined value. Some oil is allowed to flow along the shaft 24 and through the journal bearing formed by the bore 26 in the cylinder head 28 so as to provide lubrication therefor.

On the intake stroke of the engine 10, the pressure in the oil line 58 forces the ball 70 from its seat and opens inlet valve 13 which allows a metered flow of engine oil under pressure to enter and fill the reservoir 16. The rotary valve member 12 is thus moved downwardly in the cylinder. On the compression stroke, valve member 12 is indexed from the inlet passage 34 to the spark plug 36 and the pressure in the cylinder rises. The pressure in the combustion space above piston 14 acts on the lower face 20 of the valve member 12 and increases the pressure of the oil in the reservoir 16 to seat the ball valve 70 thus closing the flow of oil into the reservoir 16. If the combustion chamber pressure exceeds the pressure of the oil in the balance reservoir by a preset amount above the desired combustion pressure, the pressure of the oil in the balance reservoir 16 will lift the check member 88 from its seat and allow oil to be discharged through the spill valve 80. The valve member 12 will therefore be moved axially upwardly and the combustion space will be increased, thereby lowering the compression ratio and reducing the combustion pressure to the optimum value for the load.

As an example of how the valve 12 functions during actual operation, let it be assumed that the load on the engine is light, such as at idling or in the case of an auto engine at some low-level-road speed. The valve member 12 will be maintained in its highest compression ratio position (lowest position in the cylinder) since the oil reservoir 16 will be full; and except for small flow of oil past the shaft 24 there is no appreciable flow (out of the reservoir 16 through the spill valve 15). Now, assume that the throttle is suddenly opened fully. On the next compression stroke the pressure in the cylinder, and thus the combustion pressure, will be a maximum. This high combustion pressure will be communicated to the oil in the balance reservoir 16 to open the spill valve 15 and the oil will be discharged quickly from the reservoir into a region of lower pressure. This discharge of oil allows the valve member 12 to move quickly upwardly to its extreme upward position thus rapidly lowering the compression ratio. The valve member will remain in its uppermost position as long as the load is heavy i.e. as long as the pressure in the combustion chamber produces an upward force on the valve member 12 in excess of the setting of the spill-valve, check member 88. Since the flow of oil into the reservoir 16 is restricted by the metering passage 62 in the inlet valve 13, the downward movements of the valve member 12 will be limited during each cycle.

On the next cycle, if the load on the engine is decreased and the throttle is partially closed, the pressure in the combustion chamber will drop and the pressure of the oil from the oil pump will tend to move the valve member 12 downwardly to reduce the clearance volume and thus increase the compression ratio. Thus, there is a constant oscillating or up and down motion of the valve member 12 produced by the combination of oil supply and oil relief.

Since oil is continuously circulated in the balance reservoir 16, the valve member 12 is cooled. Thrust load is taken hydraulically by the oil in the balance reservoir 16 and thus the necessity for special thrust bearings for the rotary valve member 12 is virtually eliminated. An engine equipped with the present variable compression ratio system will be more efficient at part-load because it operates at a higher compression ratio than would normally be the case of a constant pressure compression ratio type engine.

By continuously varying the compression ratio of the engine so as to maintain a substantially constant-peak combustion pressure regardless of the load, in essence then, the "effective compression ratio" is held substantially constant. The compression ratio is varied such that it is the highest allowable for each load condition. The setting of the spill valve 15 is dependent upon the octane rating of the fuel being burned, i.e. high pressure for high octane and vice versa, and should be the highest possible without knock, pre-ignition or abnormal combustion.

In order to limit the amount of downward travel of the valve member 12, a longitudinally extending position-limiting, spill-slot 90 is formed in the shaft 24. This provides an effective means for rapidly lowering the oil pressure and volume in the balance reservoir 16 when the valve member 12 is lowered to a predetermined maximum point at which the lowermost portion 92 of the spill slot 90 clears the inner surface 94 of the cylinder head 28.

The seal rings on the upper portion of the valve body may be a combination of compression-type rings and oil control-type rings as in the case of power pistons since the valve member separates a gaseous region from a fluid region in carrying out its dual function as a valve to control the events of the cycle and as means for varying the compression ratio of the engine.

Annular wear strips, washers or the like 96 may be provided at the locations where the spur gear 30 contacts the cylinder head 28 and where the top face 18 of valve members 12 contacts the inner surface 94 of head 28. Also, a wear strip 98 may be provided on top of the valve member 12.

The construction of the engine 10 as far as the block and other details are concerned, is similar in many respects to other engines of this type in that it may be provided with suitable water cooling passages 102, an oil pan 104 to contain crankcase oil, and an appropriate cover member 106 to enclose the cylinder head, gear train, etc.

It has been found that the cylinder head 28 can be integral with the engine block as shown, thus simplifying the construction of the engine and eliminating head gaskets and the like which are often a source of problems.

The present engine is adaptable for use with many different types of fuels. While the invention has primary utility in a four-stroke cycle engine, many of its features are equally well adapted to two-stroke cycle engines.

Having thus described the invention, it is to be understood that various changes, alterations and modifications of the embodiment illustrated may be made without departing from the scope of the invention as defined in the following claims.

What is claimed is:

1. In a four-stroke cycle, internal combustion engine having a rotary valve member positioned in the combustion end of a cylinder of the engine wherein the events of the cycle are controlled by the successive indexing of a combustion space formed in the valve member with an intake port, an exhaust port and a spark plug, the improvement comprising means mounting said valve member for axial movement within said cylinder whereby the clearance between said valve member and a power piston in said cylinder is varied to thereby vary the compression ratio of said engine, means forming an hydraulic reservoir in said cylinder in fluid communication with said valve member, means for automatically controlling the pressure and volume of the fluid in said reservoir to produce said axial movement in proportion to the combustion pressure in said cylinder, said control means continuously regulating said pressure and volume in response to changes in said combustion pressure caused by changes in engine load, whereby the compression ratio in said engine is continuously varied to maintain a substantially constant combustion pressure in said cylinder, said means mounting said valve member including wall means fixedly mounted on said cylinder, and shaft means reciprocably mounted in said wall means and supporting said valve member within said cylinder, with said valve member being reciprocable toward and away from said wall means, and said means forming an hydraulic reservoir defining an annular fluid body interposed generally axially between said wall means and said valve member and encircling said shaft means, with said annular fluid body providing thrust bearing means interposed between said valve member and said wall means.

2. In the internal combustion engine according to claim 1, said means for controlling the pressure and volume of the fluid in said reservoir comprising inlet valve means providing fluid communication between a source of hydraulic fluid under pressure and said reservoir for admitting said fluid into said reservoir when the pressure of said fluid from said source exceeds the pressure of said fluid in said reservoir, and outlet valve means providing fluid communication between said reservoir and a sump at substantially atmospheric pressure for rapidly discharging fluid from said reservoir to said sump when the fluid pressure in said reservoir reaches a predetermined value, said predetermined value being in excess of the optimum combustion pressure for said engine for the fuel being burned.

3. In a four-stroke cycle, internal combustion engine having a rotary valve member positioned in the combustion end of a cylinder of the engine wherein the events of the cycle are controlled by the successive indexing of a combustion space formed in the valve member with an intake port, an exhaust port and a spark plug, the improvement comprising means mounting said valve member for axial movement within said cylinder whereby the combustion chamber clearance between said valve member and a power piston in said cylinder is varied to thereby vary the compression ratio of said engine, means forming an hydraulic reservoir in said cylinder in fluid communication with said valve member, and means for automatically controlling the pressure and volume of the fluid in said reservoir to produce said axial movement in proportion to the combustion pressure in said cylinder, said control means continuously regulating said pressure and volume in response to changes in said combustion pressure caused by changes in engine load, whereby the compression ratio in said engine is continuously varied to maintain a substantially constant combustion pressure in said cylinder, said control means for regulating the pressure and volume of the fluid in said reservoir including inlet valve means providing fluid communication between a source of hydraulic fluid under pressure and said reservoir and operable to admit said fluid into said reservoir when the pressure of said fluid from said source exceeds the pressure of said fluid in said reservoir, and outlet valve means providing fluid communication between said reservoir and a sump at substantially atmospheric pressure for rapidly discharging fluid from said reservoir to said sump when the fluid pressure in said reservoir reaches a predetermined value, said predetermined value being in excess of the optimum combustion pressure for said engine for the fuel being burned, and axial position limiting means for said valve member operable to prevent the combustion chamber clearance from being reduced beyond a predetermined minimum value, said position limiting means including means defining a passage for allowing discharge of fluid from said reservoir to said sump when said valve member reaches a predetermined axial position in said cylinder.

4. In a rotary valve-operated, four-stroke cycle, internal combustion engine, a power cylinder, a power piston slidably received in one end of said cylinder, an intake port, an exhaust port and a spark plug in said cylinder and spaced circumferentially about the wall thereof between the top dead center position of said piston and a cylinder head, a cylindrical valve body slidably received in the combustion end of said cylinder and having a combustion space formed therein, said valve body being rotated by a shaft extending outwardly of said cylinder through a bore formed in said cylinder head at a precise speed to bring said combustion space into fluid communication with said ports and said spark plug successively, thereby controlling the events of said cycle, and hydraulic means for moving said valve body axially within said cylinder for varying the compression ratio of said engine as the load on said engine changes comprising:

a balance reservoir formed by said cylinder head and a portion of said valve body, pump means for supplying hydraulic fluid under pressure to said reservoir from a source, sump means for collecting fluid discharged from said reservoir, an inlet check valve positioned in said cylinder head providing fluid communication between said source and said reservoir and preset to allow fluid into said reservoir when the pressure from said source exceeds the pressure in said reservoir, and an outlet check valve providing fluid communication between said reservoir and said sump positioned in said cylinder head and preset to allow fluid in said reservoir to be discharged to said sump when the pressure of the fluid in said reservoir reaches a predetermined value, annular seal means on said valve body for preventing said fluid from passing into the combustion chamber and for preventing the flow of gases from said combustion chamber into said balance reservoir, said predetermined value of pressure for opening said outlet valve being less than the highest combustion pressure obtainable in said engine for the fuel being burned without abnormal combustion, the pressure and volume of the fluid in said reservoir acting on said valve body to produce said axial movement thereof, whereby the compression ratio of said engine is varied in proportion to changes in said combustion pressure caused by changes in engine load to thereby maintain a substantially constant peak combustion pressure in said cylinder.

5. In the internal combustion engine according to claim 4, a positive limiting spill slot is formed in said valve body shaft extending longitudinally thereof, said spill slot providing fluid communication between said reservoir and said sump when said valve body and said shaft reach a predetermined axial position in said cylinder defined by the maximum compression ratio of said engine.

6. In the internal combustion engine according to claim 5, wherein said fluid supplied to said reservoir in engine lubricating oil supplied under pressure from the crankcase.

7. In the internal combustion engine according to claim 6, wherein said inlet valve includes a passage formed therein of reduced diameter for restricting the flow of oil into said reservoir when the pressure from said supply exceeds the pressure in said reservoir, said outlet spill valve having a passage for discharging oil from said reservoir at a substantially greater rate than the flow of fluid in through said metering valve.

8. In the internal combustion engine according to claim 7, said bore forming a journal bearing in said cylinder head through which said valve body shaft is slidably received, said journal bearing being dimensioned such that oil from said reservoir is forced through said bearing and along said shaft for lubricating purposes during axial and rotational movement of said valve member.

9. In the internal combustion engine according to claim 8, gear means on said shaft exteriorly of said cylinder for rotating said shaft and said valve body, and wear strip means disposed about said bore on said cylinder head inside and outside of said cylinder for reducing the wear on said gear means and said valve body.

10. In the internal combustion engine according to claim 4, wherein said balance reservoir defines a rotary thrust bearing for said rotary valve.

11. In an internal combustion engine, a power cylinder, a rotary valve member having a portion communicating with the interior of said cylinder, means mounting said rotary valve member for axial movement, means forming an hydraulic reservoir in communication with said rotary valve member, said hydraulic reservoir being adapted to contain fluid defining a fluid rotary thrust bearing for said valve member, means for automatically controlling the pressure and volume of the fluid in said reservoir to produce said axial movement of said rotary valve member in response to changes in operating conditions of said engine, said means mounting said rotary valve member including wall means fixedly mounted on said cylinder, and shaft means reciprocably mounted in said wall means and supporting said valve member within said cylinder, with said valve member being reciprocable toward and away from said wall means, and said hydraulic reservoir defining an annular fluid body interposed generally axially between said wall means and said valve member and encircling said means, with said annular fluid body providing said thrust bearing interposed between said valve member and said wall means.

12. A method of supporting and cooling an axially movable rotary valve for an internal combustion engine comprising the steps of forming a reservoir of fluid under pressure to engage said valve, supplying cool fluid under pressure to said reservoir from a source discharging fluid from said reservoir which has become heated by said valve to a cool region of low pressure,
controlling said supply and said discharge of fluid,
varying the pressure and volume of the fluid in said reservoir in response to changes in axial loading of said valve,
allowing said valve to move axially as the pressure and volume of said fluid in said reservoir varies, and
maintaining said reservoir of fluid in generally axial engagement with said valve, with said reservoir functioning as a thrust bearing for said valve.

References Cited

UNITED STATES PATENTS 2,387,973 10/1945 Aspin _____ 123—48
2,769,433 11/1956 Humphreys _____ 123—48

RALPH D. BLAKESLEE, *Primary Examiner.*

UNITED STATES PATENT OFFICE
CERTIFICATE OF CORRECTION

Patent No. 3,395,680                                      August 6, 1968

John H. Brooks

It is certified that error appears in the above identified patent and that said Letters Patent are hereby corrected as shown below:

Column 1, line 20, "mmeber" should read -- member --; line 44, "mixtrues" should read -- mixtures --. Column 2, line 5, "porton" should read -- portion --. Column 7, line 72, "positive" should read -- position --. Column 8, line 5, "in" should read -- is --.

Signed and sealed this 13th day of January 1970.

(SEAL)
Attest:

Edward M. Fletcher, Jr.                         WILLIAM E. SCHUYLER, JR.
Attesting Officer                                    Commissioner of Patents